March 17, 1936.　　　R. A. SHELLEY　　　2,034,253
THROTTLE CONTROL DEVICE
Filed Jan. 8, 1935　　　2 Sheets-Sheet 1
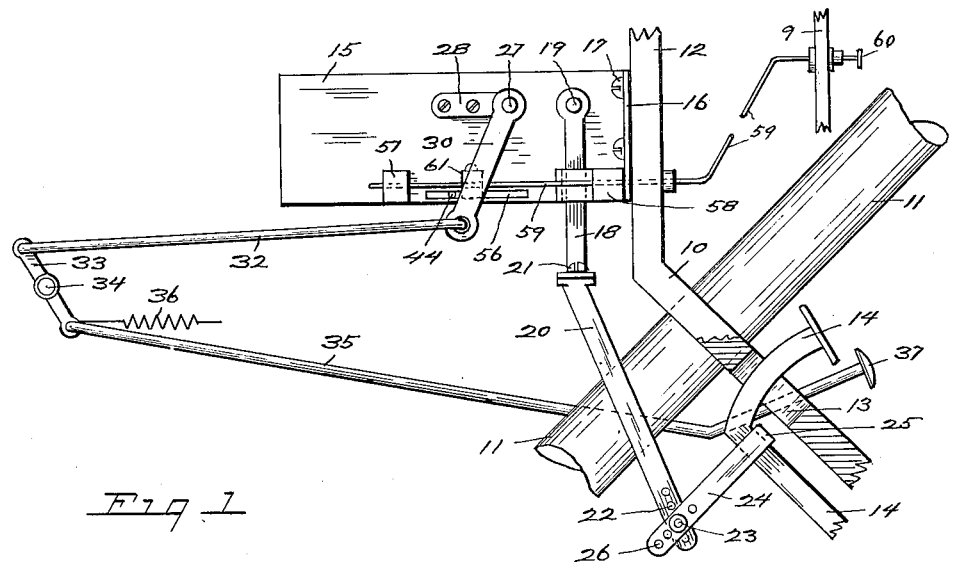
Fig 1.
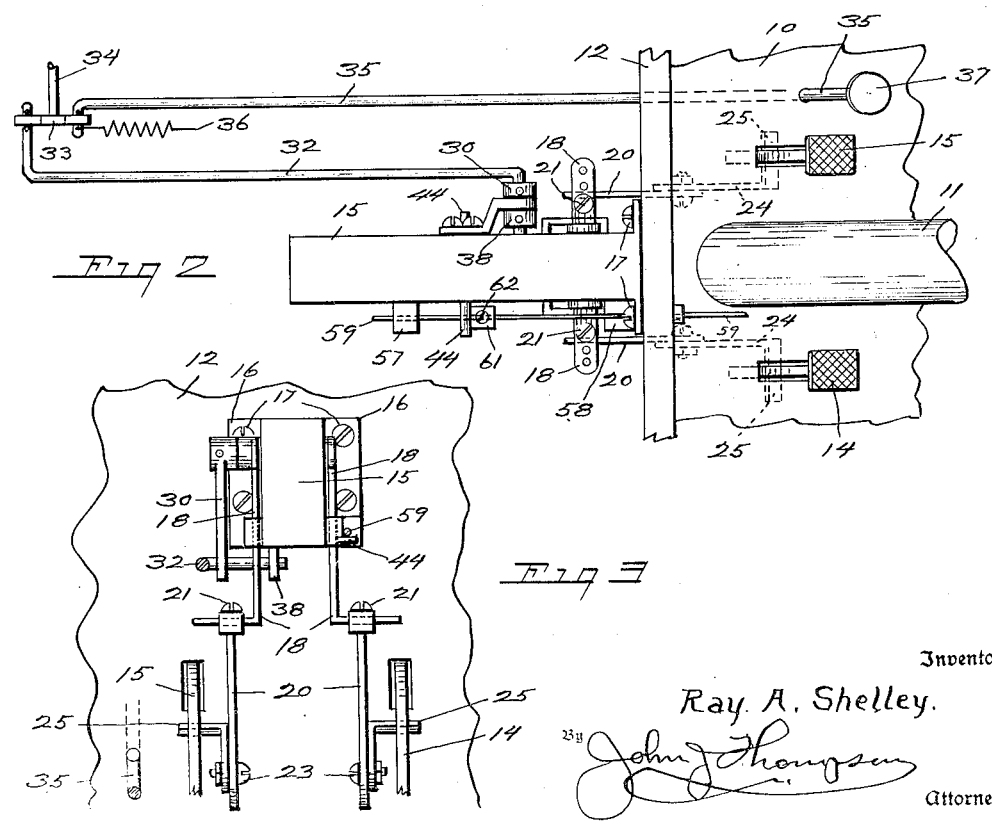
Fig 2.
Fig 3.
Inventor
Ray. A. Shelley.
By John Thompson
Attorney March 17, 1936.  R. A. SHELLEY  2,034,253
THROTTLE CONTROL DEVICE
Filed Jan. 8, 1935  2 Sheets-Sheet 2
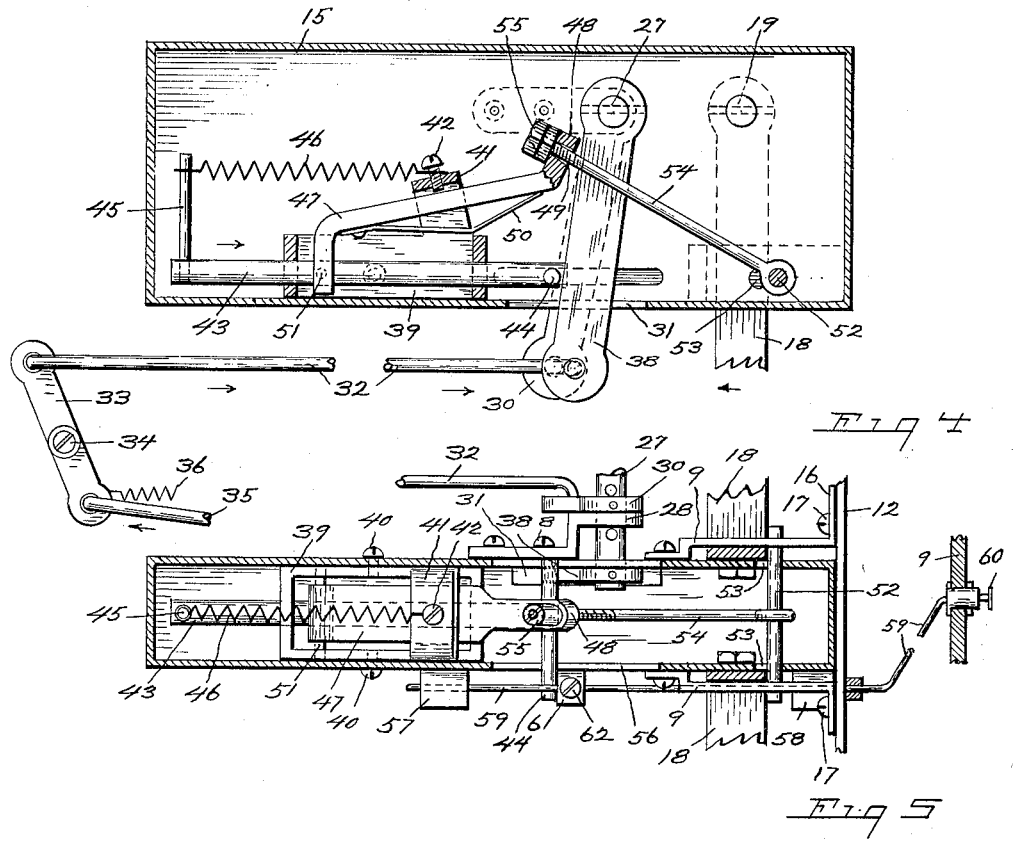
Inventor
Ray A. Shelley.
By John Thompson
Attorney Patented Mar. 17, 1936

2,034,253

UNITED STATES PATENT OFFICE 2,034,253

THROTTLE CONTROL DEVICE

Ray A. Shelley, Chicago, Ill.

Application January 8, 1935, Serial No. 832

2 Claims. (Cl. 74—483)

This invention relates to a throttle control for carburetors of automobile engines and the like and has for its primary object to provide means whereby upon the depression of one of the pedals and the depression of an accelerator pedal to open the carburetor valve to admit more gas to the motor and give the desired speed to the vehicle, the position of the carburetor valve being maintained or set until it is desired to either reduce or increase the speed.

A further object of the invention is to provide means for releasing the control from that setting so that the motor on which the carburetor is attached will at once be permitted to return to its idling speed.

The invention is subject to assuming a wide range of forms which will vary depending upon the particular vehicle construction to which the invention is to be applied and it is my purpose to herein set forth typical forms which may be employed with but slight modifications throughout the range of vehicle structure encountered.

While I have here indicated some of the objects of the invention, many others may be obtained and for other purposes.

A very apparent advantage is that in making long drives, the foot operated button known as the accelerator may be depressed to give the desired speed to be maintained and automatically locked in such position and the operator's foot removed from the button, and no further attention is required until that speed is to be changed.

If the speed is to be increased, then further depression of the accelerator button may be made and that button, when released, returns to the setting for the first speed.

If it is desired to reduce the speed of the vehicle, then the accelerator button is released from its secured position by the operation of some other means which may be one of the clutch or brake pedals or even a special pedal designed for that purpose, or some device placed on the instrument board.

With these and other objects in view my invention consists in certain novel construction and combination of parts as will hereinafter be fully described and claimed and further illustrated in the accompanying drawings which form a part hereof, and in which like figures of reference refer to corresponding parts in all of the views, and it is understood that slight changes may be made without departing from the spirit of the invention.

In the drawings:

Figure 1 is a more or less diagrammatic illustration or side view of the device as installed on an automobile.

Figure 2 is a top plan view of the same.

Figure 3 shows an end view of the same, with some of the parts in section.

Figure 4 is an enlarged detail view of the control box showing some of the parts in section.

Figure 5 shows a top plan view of the same.

Referring to the drawings and particularly to Figures 1 to 5 inclusive, the foot board 10 of an automobile is indicated as having the dash board or fire wall 12, steering post 11 and pedal openings 13 for the brake pedal 15 and the clutch pedal 14, all of which are mounted in the usual manner and form a part of the regular equipment of the automobile as well as the carburetor valve stem operating shaft and arm.

To the front of the dash board 12 is mounted a control box 15 by its flanges 16 and the bolts 17, and to the opposite sides of this box 15 are pivoted as at 19 the two depending levers 18, to the lower ends of which are attached in an adjustable manner by the bolts 21 the arms 20 which have their lower ends provided with a series of adjustable holes 22.

A pair of similar levers 24 are provided with a series of adjustment holes 26, and these levers 20 and 24 are secured together in an adjustable manner by bolts 25 passing through these holes 22 and 26, which retain the levers 20 and 24 in a rigid manner; the upper ends of these levers 24 are formed with hooked ends 25 which are hooked under or in back of the pedal arms 14 and 15, in such a manner that the upward movement of the pedals 14 and 15 is limited by said hooked levers 24 as controlled by the backward swing of the levers 18 whose reciprocating movement is limited by the guides 9 which are attached to the box 15.
The levers 24 following the downward movement of the pedals 14 and 15, as the levers 18 have a slight forward movement within the guides 9.

Attached to one side of the box 15 by the screws 8 is a bracket 28 and within this bracket 28 and the side wall of the box 15 are formed aligned bearings within which is freely rotatably mounted a short shaft 27, and upon this shaft 27 and within the box 15 and with its lower end projecting through a slot 31 formed in the bottom of the box 15, is an arm 38; while to the other end of the shaft 27 is attached a similar arm 30 outside of the box 15.

The shaft of the usual butterfly valve of the carburetor that is regular equipment on the automobile is indicated by 34, and to this is secured a double-ended lever 33 in place of the regular lever or an auxiliary lever may be attached to the regular lever to convert it into a double-ended lever as shown.

The upper end of this lever 33 is connected by a rod 32 to the lower end of the arm 30, and the lower end of the lever 33 is connected to the usual accelerator rod 35 which has the foot button 37 by which it is moved against the action of the regular spring 36 which is attached to the lower end of the lever 33 to normally retain it in the position shown in Figure 1.

Within the control box 15 is mounted by the screws 40 a box-shaped member 39 which is formed with two aligned bearings in the ends thereof and within which is slidably mounted a shaft 43, one end of which is provided with a transverse pin 44 which has its ends extending through slots 56 in the sides of the box 15; while the other end of said shaft 43 is provided with an upright pin 45.

The box-shaped member 39 is formed with an integral yoke 41 set at an angle therewith and within which is placed an adjusting or stop screw 42.

An S-shaped lever or locking bar 47 is mounted within the member 39 on the pins 51 and is formed on its lower end with a hole of slightly larger diameter than the diameter of the shaft or plunger 43 upon which it is mounted, the plunger 43 having a sliding movement therethrough when the axis of both the hole and the plunger are aligned together.

The body of the bar 47 passing under the adjusting screw 42 is retained in normal engagement therewith by a flat spring 50 attached to the bar 47 and in contact with the member 39.

The upper end of the bar 47 is formed with a tapered hole 49 within which is placed the end of a rod 54 which is provided with the threaded adjusting nut 55; while the lower end of said rod 54 is formed with an eye through which extends in a loose manner the shaft 52, the ends of which are slidably mounted in slots 53 formed in the sides of the box 15.

The ends of this shaft 52 project slightly from the sides of the box 15 and are in contact with the edges of the levers 18, and when either or both of the pedals 14 and 15 are depressed, through the movement of either or both of the levers 18 this shaft 52 will move forward in the slots 53 through the primary action of the spring 43 which follows up the locking lever 47 which is moved into an unlocked position so that the plunger 43 may freely move through the hole in the locking lever 47.

Thus as the plunger 43 is a loose fit within the eye of the rod 47 when their axes are aligned, it will be seen that if through the movement of either or both the clutch or brake pedals and the levers 18 are permitted to move forward and rock the shaft 52 the member 47 will move forward and upward by the action of the spring 50 until it contacts with the screw 42. This movement bringing the axes of the eye and the plunger 43 in parallel relation releasing the grip of the eye on the plunger. The spring 46 serves only to keep the shaft 43 in a follow up position against the locking lever 47 when the same is in an unlocked position.

For limiting the rearward movement of the pin 44, I have provided a hand operated stop mechanism comprising a flexible shaft 59 mounted in the bearings 57 and 58 attached to the box 15. This shaft 59 extending through a bearing on the instrument board 7 and having a knob 60, while upon said shaft between the bearings 57 and 58 it has adjustably secured thereon a stop 61 by the screw 62.

Thus by either pulling out or pushing in on the finger knob 60 the shaft 59 will be moved within the bearings 57 and 58 and the stop 61 moved in the path of the shaft 44 to limit the movement of said shaft 44.

In the operation of the device as shown in Figures 1 to 5 inclusive, the accelerator member 35 may be depressed by the foot knob 37 to give any desired throttle opening or position to the accelerator member 35 and throttle valve stem 34 against the action of the spring 36, which is the usual method employed.

However, when my device is to be put into operation, the accelerator rod 35 is pushed forward to shift the lever 33 until the desired performance of the vehicle is secured and then, while the accelerator rod 35 is held stationary by the pedal knob 37, a slight depression of either or both of the pedals 14 and 15 is made to permit either or both of the levers 18 to allow the shaft 52 to rock and move forward permitting the locking member 47 to tilt against the screw 42 to release the plunger 43 to be carried by the spring pressure 46 until the pin 44 contacts with the lever 38, this movement being limited by the stop 61 which is in the path of the pin 44.

This action is automatic, in that the operator's foot naturally rests upon the clutch pedal while changing gears thereby allowing the foot to be removed from the accelerator pedal at the same time that the other foot is removed from the clutch pedal after the desired gearing ratio and speed has been obtained. The control button 60 on the instrument board plays an important part in regard to this; that is after reaching third speed, the foot might be removed from the clutch pedal, before the vehicle had gained its full momentum, which would result in a locked position that might be faster than that desired.

Now, if a predetermined speed is desired, that the unit will not lock beyond, the instrument control button 60 may be pushed in until it stops, at the time you are traveling at that speed, and the unit is in a locked position. For example: assume that the button 60 is all the way out and you are traveling at 60 miles per hour with both feet free from the pedals, and that the vehicle has reached its full momentum. Now, if the control button 60 is pushed in until it stops, the device can never lock beyond the desired speed.

After the vehicle is in high speed, the accelerator may be depressed as far as possible if so desired and the foot removed from the pedals, but the throttle setting will return to the desired position or predetermined speed, and of course this setting may be at any position from low to high speed, and throttle may also be locked at any position up to this setting.

It must be understood that the accelerator rod 35, the arms 34, rod 32 and arm 30 all act in unison and that the arm 38 moves with the foot accelerator rod 35 at all times, without reference to the unit, and the instrument control rod might be all the way in, causing the unit to be inoperative, but the rod 32 and arm 38 would continue to move in unison with the accelerator. The spring 36 with its regular equipment on the car, being stronger than the spring 46 controls the movement of the arm 33 tending to close the throttle. This spring 46 is for the purpose of causing the plunger 43 to follow up the arm 38 when the locking lever 47 is released.

Should the control button 60 be set at a position that is less than you have pushed in on the accelerator rod, the shaft plunger 43 will stop at that point instead of contacting with the arm 38, and if this takes place the arm 38 will return to that same position when pressure is released by the foot.

The vehicle will then continue to operate as controlled by the throttle position thus maintained. When it is desired to speed up the vehicle momentarily the accelerator member 35 may be depressed further to rock the throttle member 33 accordingly, all without interference from the locking device, and upon release of the accelerator member 35, the lever 38 will rock back against the pin 44 where it will be maintained by reason of the lower end of the lever member 47 being held by the plunger 43.

When it is desired to reduce the speed of the vehicle from that as determined by the secured position of the plunger 43 as above indicated, a slight pressure on either of the pedals 14 or 15 will at once release the shaft 52 and rod 54 allowing the member 47 to tilt under the spring pressure 50.

When the vehicle is to be operated in traffic requiring frequent changes in speed, it may be desirable to hold the plunger 43 in its extreme inoperative position so that the accelerator member 35 may operate independently thereof.

Having thus described my invention, what I claim as new and desire to secure by Letters Patent, is:

1. In an accelerator control, the combination with an accelerator operating member, of a shiftable member normally tending to advance, means for securing the shiftable member in selective positions, means interposed between the operating member and the shiftable member limiting return movement of the operating member depending upon the secured position of the shiftable member, and means for releasing at will said securing means, said securing means comprising a locking member movable into and out of engagement with the shiftable member, a spring tending to urge the locking member out of engagement with the shiftable member, and means for counteracting the action of said spring when the locking member is in an engaged position.

2. In an accelerator control, the combination with an accelerator operating member, of a shiftable member normally tending to advance, means for securing the shiftable member in selective positions, means interposed between the operating member and the shiftable member limiting return movement of the operating member depending upon the secured position of the shiftable member, and means for releasing at will said securing means, said securing means comprising a locking member movable into and out of engagement with the shiftable member, a spring tending to urge the locking member out of engagement with the shiftable member, and means for counteracting the action of said spring when the locking member is in an engaged position, said releasing means comprising a pedal, and said other means comprising a lever in the path of the pedal, and a connection between the locking member and the said lever whereby the pedal normally holds the lever in a locked position pulling the locking member into said engagement.

RAY A. SHELLEY.